(12) United States Patent
Bremer (10) Patent No.: US 11,326,879 B2
(45) Date of Patent: May 10, 2022

(54) INCLINOMETER-BASED SURFACE PROFILOMETRY

(71) Applicant: Appareo Systems, LLC, Fargo, ND (US)

(72) Inventor: Marshall T. Bremer, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 169 days.

(21) Appl. No.: 16/832,780

(22) Filed: Mar. 27, 2020

(65) Prior Publication Data

US 2020/0309521 A1 Oct. 1, 2020

Related U.S. Application Data

(60) Provisional application No. 62/827,574, filed on Apr. 1, 2019.

(51) Int. Cl.
*E01H 4/02* (2006.01)
*G01C 7/04* (2006.01)
*G01B 11/24* (2006.01)
*G01B 5/28* (2006.01)

(52) U.S. Cl.
CPC ............... *G01C 7/04* (2013.01); *G01B 5/285* (2013.01); *G01B 11/24* (2013.01); *E01H 4/023* (2013.01)

(58) Field of Classification Search
CPC .......... G01C 7/04; G01B 5/285; G01B 11/24; G01B 11/14; E01H 4/023
See application file for complete search history.

(56) References Cited

U.S. PATENT DOCUMENTS

| 4,471,530 A | * | 9/1984 | Kirven | ................. | G01B 11/24 33/286 |
| 9,404,738 B2 | | 8/2016 | Toom | | |
| 2014/0324383 A1 | | 10/2014 | Toom | | |

FOREIGN PATENT DOCUMENTS

FI 126853 B * 6/2017 ............. G01B 7/345
WO WO-2017197089 A1 * 11/2017 ............... E01H 5/12

* cited by examiner

*Primary Examiner* — Tarifur R Chowdhury
*Assistant Examiner* — Jonathon Cook
(74) *Attorney, Agent, or Firm* — Kinney & Lange, P.A.

(57) ABSTRACT

A profiling machine includes an inclinometer and a displacement sensor. The inclinometer is configured to sense an incline of the profiling machine on a surface relative to the acceleration vector of gravity. The displacement sensor is configured to sense the distance that profiling machine has traversed along the surface. The profiling machine is configured to calculate and generate a surface profile of the surface based on incline data from the inclinometer and displacement data from the displacement sensor.

18 Claims, 7 Drawing Sheets

INCLINOMETER-BASED SURFACE PROFILOMETRY

CROSS-REFERENCE TO RELATED APPLICATION(S)

This application claims the benefit of U.S. Provisional Application No. 62/827,574 filed Apr. 1, 2019 for "INCLINOMETER-BASED SURFACE PROFILOMETRY" by M. T. Bremer.

BACKGROUND

This disclosure relates generally to resurfacing and leveling. More specifically, this disclosure relates to inclinometers for use in ice-surface profilometry for use during ice resurfacing and leveling.

A layer or sheet of ice creates an insulating barrier and ice thickness can have a large impact on costs associated with indoor ice rink operation and cooling costs. Deviations from planarity can cause regions of thick ice which can soften due to undercooling, thereby potentially creating a safety hazard. Deviations from planarity can also cause regions of thin ice, increasing the likelihood of damage to lines and logos installed within the ice. Measurements of deviation from planarity of a surface are used frequently during ice resurfacing to gradually correct these deviations.

Current solutions that measure deviations from planarity implement a planar laser beam projected across the rink in combination with a receiving unit mounted to a pole on the ice resurfacing machine. If the vertical location of the intersection of the beam and the receiver changes, the blade on the ice resurfacing machine can be raised or lowered to correct the deviation in the ice. These systems are expensive and rely on permanent installation of the planar laser assembly and of the receiving unit on the ice resurfacing machine.

Inertial sensors can be used to estimate position. However, inertial sensors provide a position estimate by integrating acceleration and subsequently velocity. Errors are introduced over time and those errors propagate and grow due to the double integration. In addition, slow movement hinders positional estimation in such systems due to the very small accelerations generated during small movements.

SUMMARY

The system described herein uses an inclinometer paired with a non-contact displacement sensor to measure the ice surface's deviation from planarity and provide a superior surface profile measurement in an inexpensive portable package for use in an ice resurfacing or other vehicle.

Due to the insulating barrier created by a layer of ice, ice thickness can have a large impact on the costs associated with indoor ice rink operation. Namely, thickness can affect cooling costs. In addition, acute regions of thick ice can become trouble areas as they soften due to undercooling. Thin regions of ice increase the likelihood of damaging painted lines and likewise can produce a safety hazard. Measurements of the deviation from planarity of the ice surface can be used during the ice resurfacing process, which occurs frequently in the maintenance of ice surfaces, to gradually correct these deviations.

In one example, the system and method described herein is attached to an ice resurfacing vehicle and uses an inclinometer paired with a non-contact displacement (image-based sensor) to provide a precise ice surface profile measurement in a portable and low-cost implementation.

In another example, the system and method described herein is included in a small autonomous vehicle or robotic device that can move in a pseudo-random path and create a bathymetric map of the entire ice surface by incorporating a MEMS inclinometer and using an image-based method to provide a highly accurate measure of horizontal displacement on a low-friction surface, creating a precise surface profile measurement with millimeter vertical resolution over tens of meters distance.

In another example, a camera-based displacement sensor is used to understand rotation and transverse motion and/or be augmented with an IMU device performing complementary measurements of this motion. The IMU can indicate horizontal accelerations and correct the direction of acceleration measured by the inclinometer. Techniques of this disclosure can be used for other applications that require a similarly flat surface layer but are comprised of different surface materials.

According to one aspect of the invention, an inclinometer is used to measure the orientation of the measurement platform (e.g, ice resurfacing vehicle) with respect to the acceleration vector of gravity. Displacement of the platform along the surface is measured by comparing subsequent images of the surface. Integrating the incline values with respect to the horizontal component of the displacement produces a profile of the surface along the direction of travel. By implementing high-performance inclinometers and inexpensive digital cameras, the present disclosure provides high-precision measurements of low friction surfaces.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein the use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise. Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Figure 1:
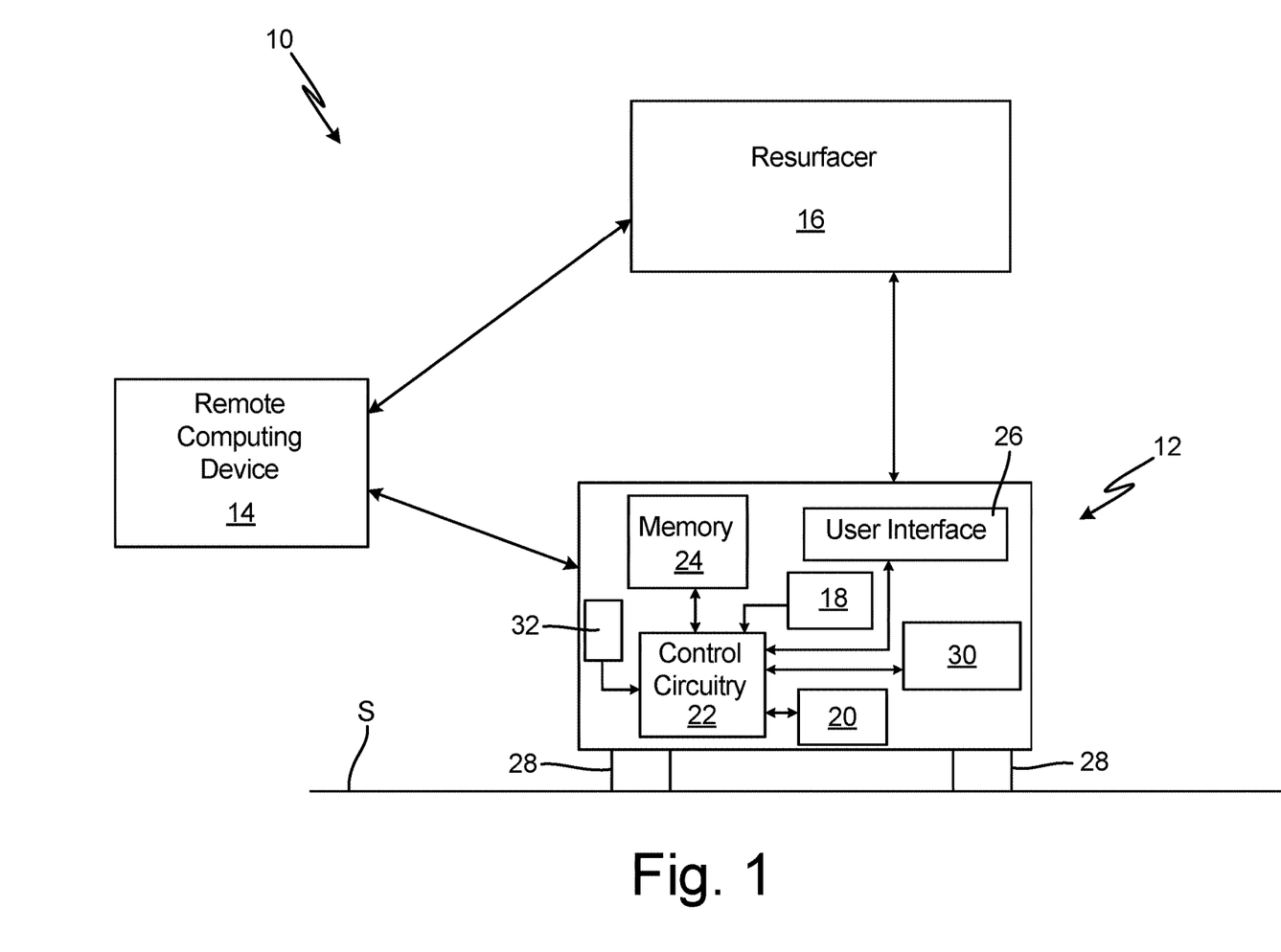
FIG. 1 is a schematic block diagram of an ice resurfacing system.

FIG. 1 is a schematic block diagram of system 10. System 10 includes profiling machine 12, remote computing device 14, and resurfacer 16. Profiling machine 12 includes inclinometer 18, displacement sensor 20, control circuitry 22, memory 24, user interface 26, surface contact points 28, power source 30, and contact sensor 32.

System 10 is illustrated as an ice resurfacing system. It is understood, however, that system 10 can be utilized in multiple environments and across multiple applications to provide surface profiling. For example, profiling machine 12 can be utilized to sense the flatness of a floor, a subfloor, a parking lot, and/or a field such as a sports field, among other surface options.

Profiling machine 12 is configured to sense the relative flatness of surface S that profiling machine 12 is traversing and is further configured to generate surface profile data regarding that surface. In examples where surface S is ice, system 10 can include resurfacer 16. Resurfacer 16 is a machine configured to clean and smooth the ice surface. Resurfacer 16 can be configured to communicate directly or indirectly with profiling machine 12. Resurfacer 16 can include a blade configured to shave the top layer of ice and can further include a wash system that sprays water onto the ice surface, among other options. The height of the blade can be controlled manually by the user or automatically by the resurfacer 16 to allow for deeper or shallower cuts to control the flatness of the ice surface.

Remote computing device 14, as illustrated in FIG. 1, is remote from and communicatively coupled with one or more of profiling machine 12 and resurfacer 16. Remote computing device 14 can be any device including processing circuitry and memory configured to operate in accordance with techniques described herein to receive one or more of incline data, displacement data, and surface profile data, among other data, and further to generate commands and reports regarding the surface profile of surface S. For example, remote computing device 14 can be a smartphone or tablet that receives data from one or both of profiling machine 12 and resurfacer 16. In other examples, remote computing device 14 can be a server computer that receives data from profiling machine 12 and can store the data and or provide information regarding the surface profile to a user. Remote computing device 14 can also provide commands to resurfacer 16 based on data received from profiling machine 12 and can also provide commands to profiling machine 12, such as commands input to remote computing device 14 by a user. In yet other examples, remote computing device 14 can be embodied in multiple computing devices that distribute functionality attributed herein to remote computing device 14 among the multiple devices. Remote computing device 12 can thereby represent a cloud computing network.

Profiling machine 12 is configured to sense the relative flatness of surface S and to generate data regarding the relative flatness of surface S. Profiling machine 12 can be communicatively coupled to one or both of remote computing device 14 and resurfacer 16 through wired or wireless connections, or both. Power source 30 is configured to provide power to various components of profiling machine 30. It is understood that power source 30 can include a more than one individual power source 30 providing power to the same or different components.

Surface contact points 28 are in contact with surface S. For example, surface contact points 28 can be plates, wheels, coasters, casters, rollers, balls, skids, tracks, flats, or of any other form that contacts surface S and supports profiling machine 12 on surface S as profiling machine 12 traverses surface S. In some examples, surface contact point 28 can include one or more propulsive supports that are configured to propel profiling machine 12 relative to surface S. As such, profiling machine 12 can be self-propelled. For example, profiling machine 12 can include wheels or skids. In some examples, power source 30 can include a motor configured to provide motive power to the one or more propulsive supports supporting profiling machine 12 on surface S. In some examples, the motor is an electric motor. In some examples, each propulsive support includes a dedicated motor such that each support can be driven independently of the other supports.

In some examples, surface contact point 28 can include one or more points configured to slide along surface S. For example, profiling machine 12 could be formed as a puck that slides along surface S, similar to a hockey puck. In such an example the side surface of the body of profiling machine 12 can form surface contact point 28.

Contact sensor 32 is configured to sense when profiling machine 12 contacts an object, and can, in some examples, extend around a periphery of profiling machine 12 and/or include a one or more discrete sensors. Contact sensor 32 can provide a signal to control circuitry 22 regarding the obstacle. Control circuitry 22 can cause power source 30 to drive the propulsive supports and rotate profiling machine 12 relative to surface S. Profiling machine 12 can then proceed forward in a new direction until contact sensor 32 again senses contact.

Inclinometer 18 is disposed on profiling machine 12. Inclinometer 18 can include an accelerometer configured to measure the orientation of inclinometer 18 with respect to the acceleration vector of gravity. Inclinometer 18 thereby senses the angular displacement of inclinometer 18 with respect to the acceleration vector of gravity, and the incline data is generated based on that angular displacement. Inclinometer 18 is thus configured to sense the slope or tilt of profiling machine 12 relative to the acceleration vector of gravity. Inclinometer 18 can generate incline data that can be stored in memory 24 and/or transmitted to remote computing device 14. In some examples, inclinometer 18 can be a two-axis inclinometer, including, e.g., two mutually-orthogonal accelerometers. In some examples, inclinometer 18 can be a Micro-Electro-Mechanical Systems ("MEMS") inclinometer. In some examples, inclinometer 18 can include a gyroscope and an accelerometer. As such, inclinometer 18 can, in some examples, provide data regarding rotation of profiling machine 20 relative to surface S. It is understood, however, that inclinometer 18 can take the form of any configuration suitable for generating data regarding an incline of profiling machine 12 relative to surface S.

Displacement sensor 20 is disposed on profiling machine 12. Displacement sensor 20 is configured to sense the distance that profiling machine 12 has traversed across surface S. Displacement sensor 20 can generate displacement data that can be stored in memory 24 and/or transmitted to remote computing device 14. Displacement sensor 20 can take the form of any configuration for sensing the displacement of profiling machine 12 relative to surface S. For example, displacement sensor 20 can be encoder-based and/or can include a non-contact optical sensor, among other options. For example, where displacement sensor 20 includes an encoder, the encoder can be configured to sense rotation of a wheel of profiling machine 12 relative to surface S. In examples where displacement sensor 20 includes an optical sensor, displacement sensor 20 can include one or more cameras, can include one or more photodiode arrays, can include one or more opto-electric transducers, or can take the form of any other non-contact optical sensing arrangement suitable for generating data regarding a displacement of profiling machine 12 relative to surface S.

In one example, displacement sensor 20 is an optical sensor including a light source and a digital camera. The light source is mounted to profiling machine 12 and is configured to illuminate surface S at a shallow angle to highlight minor imperfections in surface S, thereby generating unique patterns. The digital camera is mounted to profiling machine 12 and configured to capture images of surface S that include the unique patterns generated by the light source illuminating surface S. The distance between the camera and surface S is known, so the images can, for example, be cross-correlated to determine the distance that profiling machine 12 has traversed relative to surface S. Optical sensing is particularly suitable for profiling low-friction surfaces such as ice. Some displacement sensors, such as wheel encoders, can create measurement errors on low-friction surfaces due to slippage. Optical sensing is accurate to the precision level of the sensor, such as to within one pixel of the digital camera.

Control circuitry 22 can include one or more processors, configured to implement functionality and/or process instructions. For example, control circuitry 22 can be capable of processing instructions stored in memory 24. Examples of control circuitry 22 can include any one or more of a microprocessor, a controller, a digital signal processor (DSP), an application specific integrated circuit (ASIC), a field-programmable gate array (FPGA), or other equivalent discrete or integrated logic circuitry.

In some examples, control circuitry 22 can include communications circuitry configured to facilitate wired or wireless communications by profiling machine 12. For example, the communications circuitry can facilitate radio frequency communications and/or can facilitate communications over a network, such as a local area network, wide area network, and/or the Internet. In some examples, control circuitry 22 can include motor control circuitry configured to control operation of a motor propelling profiling machine 12.

Memory 24, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 24 is a temporary memory, meaning that a primary purpose of memory 24 is not long-term storage. Memory 24, in some examples, is described as volatile memory, meaning that memory 24 does not maintain stored contents when power to profiling machine 12 is turned off. Examples of volatile memories can include random access memories (RAM), dynamic random access memories (DRAM), static random access memories (SRAM), and other forms of volatile memories. In some examples, memory 24 is used to store program instructions for execution by control circuitry 22. For example, memory 24 can store instructions that, when executed by control circuitry 22, cause profiling machine 12 to generate the incline data based on the angular displacement information received from inclinometer 18 and/or cause profiling machine 12 to generate the displacement data based on images generated by displacement sensor 20. Memory 24, in one example, is used by software or applications running on control circuitry 22 to temporarily store information during program execution.

Memory 24, in some examples, also includes one or more computer-readable storage media. Memory 24 can be configured to store larger amounts of information than volatile memory. Memory 24 can further be configured for long-term storage of information. In some examples, memory 24 includes non-volatile storage elements. For example, profiling machine 12 can include non-volatile storage elements such as flash memories or forms of electrically programmable memories (EPROM) or electrically erasable and programmable (EEPROM) memories. In some examples, memory 24 can be external and can be received in a memory card slot of profiling machine 12. For example, memory 24 can be an external hard drive, flash drive, memory card, secure digital (SD) card, micro SD card, or other such device.

Memory 24 can be encoded with instructions that, when executed by control circuitry 22, causes profiling machine 12 to generate a surface profile based on the incline data and on the displacement data. For example, the relative elevation of a point on surface S can be determined by cumulatively summing the incline and multiplying by the displacement. In some examples, the relative elevation of a point on surface S can be determined by cumulatively summing the incline multiplied by the displacement, thereby cumulatively summing relative elevations. A profile of surface S can thus be generated by profiling machine 12 along the direction of travel of profiling machine 12. The profile of surface S can be stored in memory 22 and/or transmitted to remote computing device 14 and/or resurfacer 16.

User interface 26 can be any graphical and/or mechanical interface that enables user interaction with profiling machine 12. For example, user interface 26 can implement a graphical user interface displayed at a display device of user interface 26 for presenting information to and/or receiving input from a user. User interface 26 can include graphical navigation and control elements, such as graphical buttons or other graphical control elements presented at the display device. User interface 26, in some examples, includes physical navigation and control elements, such as physically-actuated buttons or other physical navigation and control elements. In general, user interface 26 can include any input and/or output devices and control elements that can enable user interaction with profiling machine 12.

Profiling machine 12 is configured to measure deviations from flat with near millimeter precision over large distances, such as the length of a hockey rink, about 60 meters (about 200 feet), or greater. In some examples, the thickness of the ice sheet can be measured and provided to profiling machine 12 such that profiling machine 12 can provide a thickness profile of surface S. The thickness data can be provided to profiling machine 12 and stored in memory 24. In such an example profiling machine 12 can generate a thickness profile based on the surface profile and the thickness data. For example, thickness data can be taken with use of a cordless drill or an ultrasound device.

In some examples, profiling machine 12 can be attached to resurfacer 16 and driven across surface S by resurfacer 16. For example, profiling machine 12 can be attached to and project in front of resurfacer 16. Profiling machine 12 can generate the profile information in real time and communicate that profile information to resurfacer 16. The resurfacer 16 can be configured to automatically adjust the height of its blade and/or the volume of water being sprayed on surface S based on the profile information received from profiling machine 12. For example, resurfacer 16 can lower the blade when profiling machine 12 indicates thicker ice, and resurfacer 16 can raise the blade and/or spray additional water when profiling machine 12 indicates thinner ice.

Additionally and/or alternatively, profiling machine 12 can be self-propelled. Profiling machine 12 is also suitable for autonomous operation. Power source 30 can include a motor configured to power movement of profiling machine 12. In some examples, profiling machine 12 can be configured to follow pre-determined pathways when profiling surface S. In other examples, profiling machine 12 can be configured to follow a pseudorandom path about surface S. When following a pseudorandom path, a surface profile can be created without knowing the start and end positions of profiling machine 12. For example, profiling machine 12 can be placed on surface S and can profile surface S along a first path until encountering an obstacle. Contact sensor 32 can sense contact with the obstacle encountered by profiling machine 12, and control circuitry 22 can cause profiling machine 12 to rotate to a second path. Profiling machine 12 can profile surface S along the second path until contact sensor 32 indicates another object, at which point profiling machine 12 can again change to a new path. Profiling machine 12 can continue to profile surface S until a full surface profile is generated. In some examples, profiling machine 12 can generate a topographic map of surface S profile. In examples where surface S is ice, the surface profile data can be provided to the operator of resurfacer 16 or to a controller of resurfacer 16 for use in resurfacing the ice.

Profiling machine 12 can determine the degree of any rotation relative to surface S to ensure that the surface profile is accurate. For example, profiling machine 12 can further include a gyroscope, inertial measurement unit, or other sensor to determine rotational displacement and transverse motion. Profiling machine 12 can also determine rotation based on information from displacement sensor 20. For example, where displacement sensor 20 includes a camera, profiling machine 12 can be configured to determine rotational displacement based on comparisons of the images generated by camera.

During operation, profiling machine 12 traverses surface S and generates both incline data (via inclinometer 18) and displacement data (via displacement sensor 20). Profiling machine 12 can calculate the relative elevation of surface S based on the incline data and the displacement data. Profiling machine 12 can generate a surface profile based on the relative elevations calculated as profiling machine 12 traverses surface S. In some examples, profiling machine 12 can communicate the incline data and displacement data to remote computing device 14, which can generate the elevation data and surface profile based on the incline data and the displacement data. Profiling machine 12 can also communicate the elevation data and surface profile to remote computing device 14 for storage and use.

The surface profile(s) determined by profiling machine 12 can be utilized to improve the flatness of surface S. Profiling machine 12 can also be utilized to improve the levelness of surface S by accounting for constant offset errors in inclinometer 18 when determining the surface profile. For example, where surface S is ice, the surface profile can be utilized by ice resurfacer 16 during resurfacing to produce a flatter ice sheet. On other surfaces, such as parking lots or playing fields, the surface profile can be used to enhance drainage or flow along surface S. On other surfaces, such as floors or subfloors, the surface profile can be used to ensure the flooring has the desired flatness characteristics prior to installation of additional flooring.

System 10 provides significant advantages. Profiling low-friction surfaces, such as ice, requires relatively slow movements that produce very small accelerations. Profiling machine 12 is configured to provide increased accuracy when moving at slow speeds over surface S. The slower that profiling machine 12 moves across surface S, the lower the uncertainty in the generated profile. For example, if there is a random error in the slope value, that random error will average out of the profile based on a large number of measurements. As such, profiling machine 12 can produce more accurate profiles by reducing the speed of profiling machine 12 relative to surface S while maintaining the sample rate for the incline data and the displacement data.

In some examples, errors induced in the incline data generated by inclinometer 18 can be caused by accelerations that add vectorially with the acceleration of gravity. These accelerations are divided into two classes based on the time-scale of the changes: vibrations; and changes in velocity. Vibrations, due to rough surfaces, will produce slope errors that average to zero given a relatively constant velocity. Such vibrations can thus average out of the generated surface profile. Changes in the velocity of profiling machine 12 produce accelerations that are more consequential to the profile measurements. Acceleration at the beginning and end of each profile measurement (starting and stopping) can produce a noticeable incline and decline, respectively. The acceleration can be measured, such as by an inertial measurement unit, and used to correct the readings.

Profiling machine 12 can generate surface profiles with near millimeter precision. The surface profiles can be utilized to enhance surface leveling, such as by resurfacer 16. Profiling machine 12 produces accurate results by directly measuring displacement with displacement sensor 20. As such, the position is not determined by a method that compounds errors, such as by twice integrating acceleration. In system 10, uncertainty is decreased due to averaging of the measurements taken. Moreover, any constant offset errors, such as those in inclinometer 18 or due to a non-level platform of profiling machine 12, can be accounted for by remeasuring the profile in a reverse direction. However, such constant offset errors are irrelevant when generating a flatness profile, as the levelness of surface S is not a concern of the flatness profile. Profiling machine 12 provides a compact unit that can autonomously measure the flatness of a surface and generate a surface profile.

Figure 2:
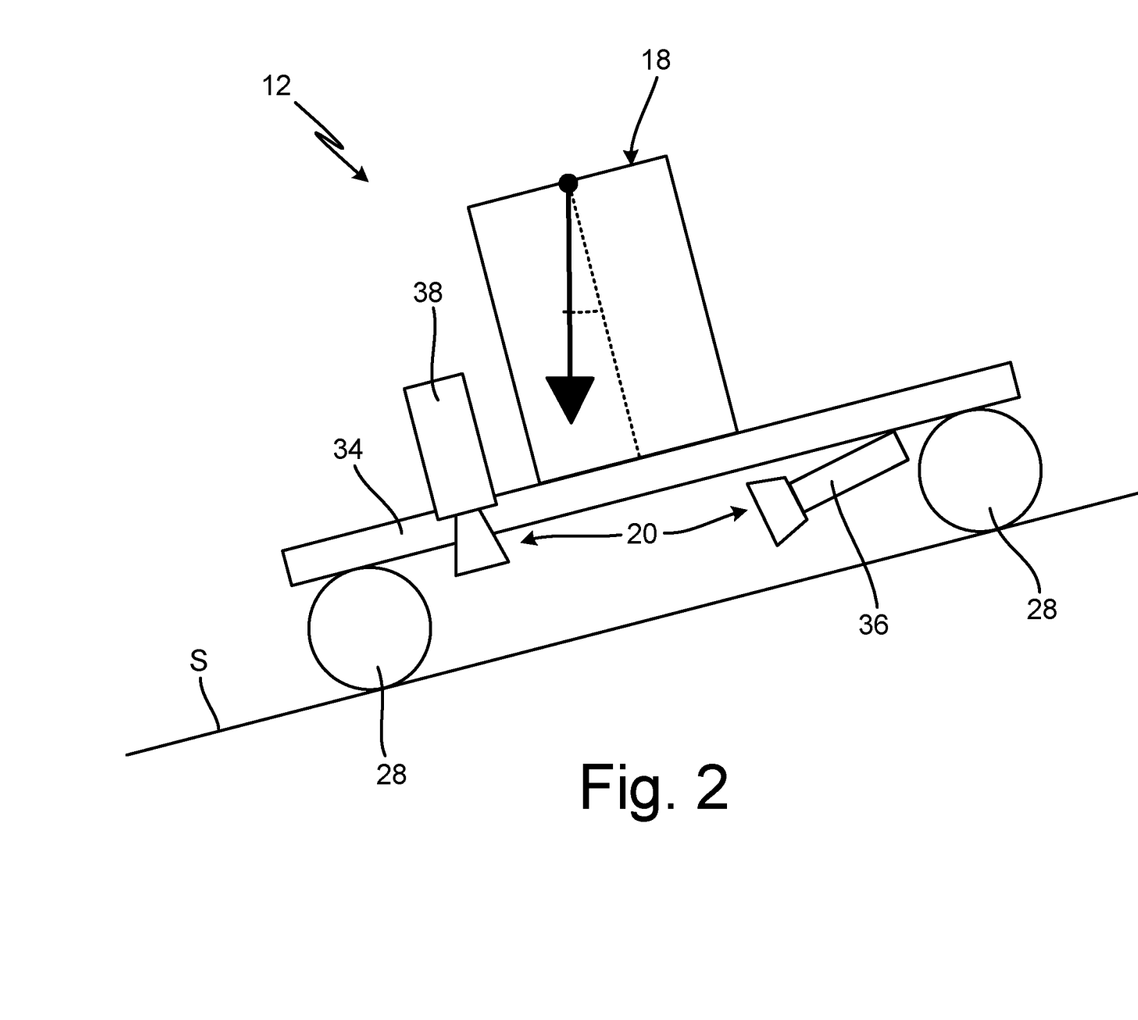
FIG. 2 is a schematic diagram of a profiling machine.

FIG. 2 is a schematic diagram of profiling machine 12. Profiling machine 12 includes inclinometer 18, displacement sensor 20, surface contact points 28, and body 34. Displacement sensor 20 includes light source 36 and camera 38.

Body 34 supports the various other components of profiling machine 12. Surface contact points 28 support body 34 on surface S, which is the surface being profiled. As shown, surface contact points 28 can be wheels. A motor, such as power source 30 (FIG. 1), is supported on body 34 and is configured to provide motive power to one or more of the wheels. It is understood that profiling machine 12 can include as many or as few wheels as desired. In one example, profiling machine 12 includes three wheels.

Inclinometer 18 is supported by body 34 of profiling machine 12. Inclinometer 18 is configured to sense the slope or tilt of profiling machine 12 relative to the acceleration vector of gravity. Inclinometer 18 generates incline data regarding the slope or tilt of profiling machine 12. The incline data can be stored in a memory of profiling machine 12, such as memory 24 (FIG. 1), and/or can be communicated to a remote computing device, such as remote computing device 14 (FIG. 1).

Displacement sensor 20 is supported by body 34 of profiling machine 12. Displacement sensor 20 is configured to sense the relative displacement of profiling machine 12 along surface S. Displacement sensor 20 generates displacement data that can be stored in the memory and/or transmitted to the remote computing device. As shown, displacement sensor 20 can be an optical sensor. Light source 36 is disposed between body 34 and surface S. Light source 36 is oriented at a relatively shallow angle relative to surface S to illuminate surface S and highlight minor imperfections in the surface S to create unique patterns. Camera 38 is oriented towards surface S to capture images of the surface S that include the unique patterns generated by light source 36 illuminating the surface. The distance between camera 38 and the surface S is known, so the images captured by camera 38 can be cross-correlated to determine the distance that profiling machine 12 has traversed relative to the surface S. Optical sensing is particularly suitable for profiling low-friction surfaces such as ice. Optical sensing is accurate to the precision level of the camera 38. As such, displacement sensor 20 is accurate to within one pixel of camera 38.

Inclinometer 18 generates incline data and displacement sensor 20 generates displacement data as profiling machine 12 traverses surface S. As discussed above, profiling machine 12 can generate a surface profile of surface S based on the incline data and the displacement data.

Figure 3:
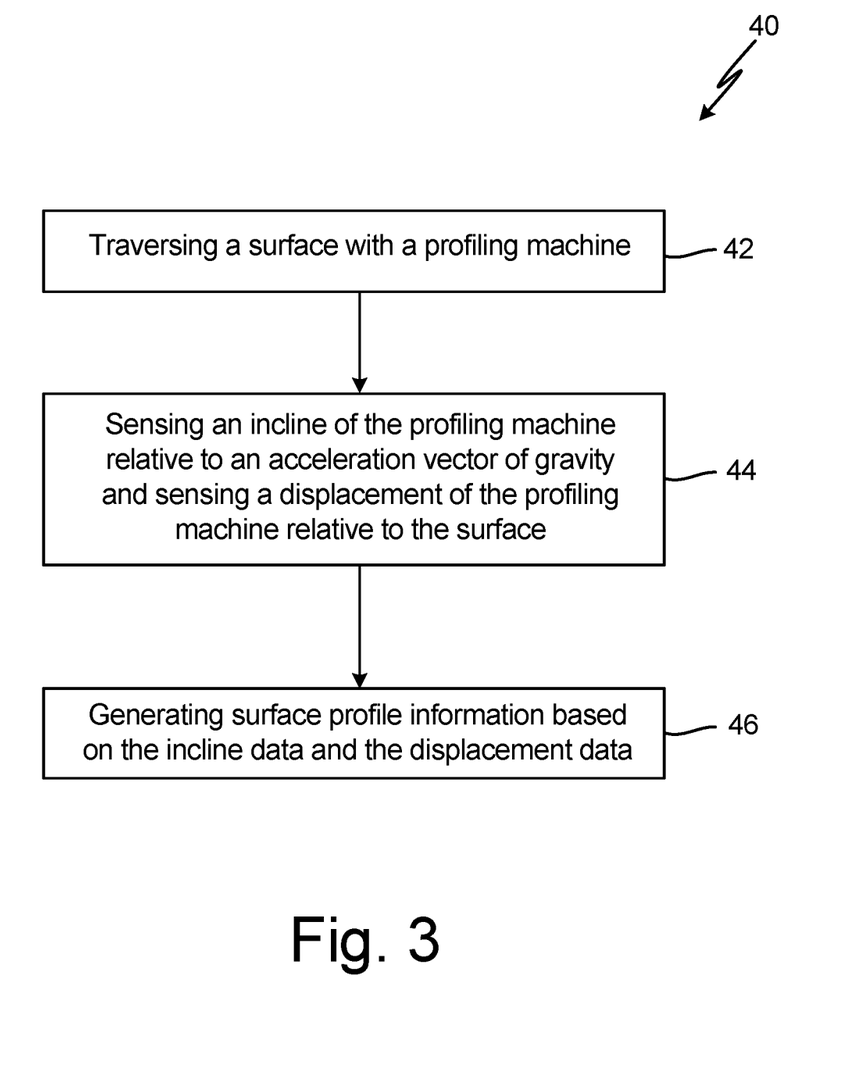
FIG. 3 is a flow chart showing a surface profiling method.

FIG. 3 is a flow chart illustrating method 40. In step 42, a profiling machine, such as profiling machine 12 (FIGS. 1 and 2), is traversed across a surface. In step 44, a inclinometer, such as inclinometer 18 (FIGS. 1 and 2), generates incline data and a displacement sensor, such as displacement sensor 20 (FIGS. 1 and 2), generates displacement data. The incline data and the displacement data can be stored in a memory of the profiling machine and/or can be communicated to a remote computing device.

In step 46, surface profile information is generated based on the incline data and the displacement data. For example, the elevation for any given point can be calculated by cumulatively summing the incline to that point and multiplying by the displacement to that point. In some examples, the relative elevation of a point on surface S can be determined by cumulatively summing the incline multiplied by the displacement, thereby cumulatively summing relative elevations. In some examples, the memory of profiling machine 12 is encoded with instructions that, when executed by control circuitry of profiling machine 12, causes profiling machine 12 to generate the surface profile information. In other examples, the incline data and the displacement data can be communicated to a remote computing device, which can generate the surface profile information. In some examples, the surface profile information can include a topographic map of the surface being profiled.

Figure 4A:
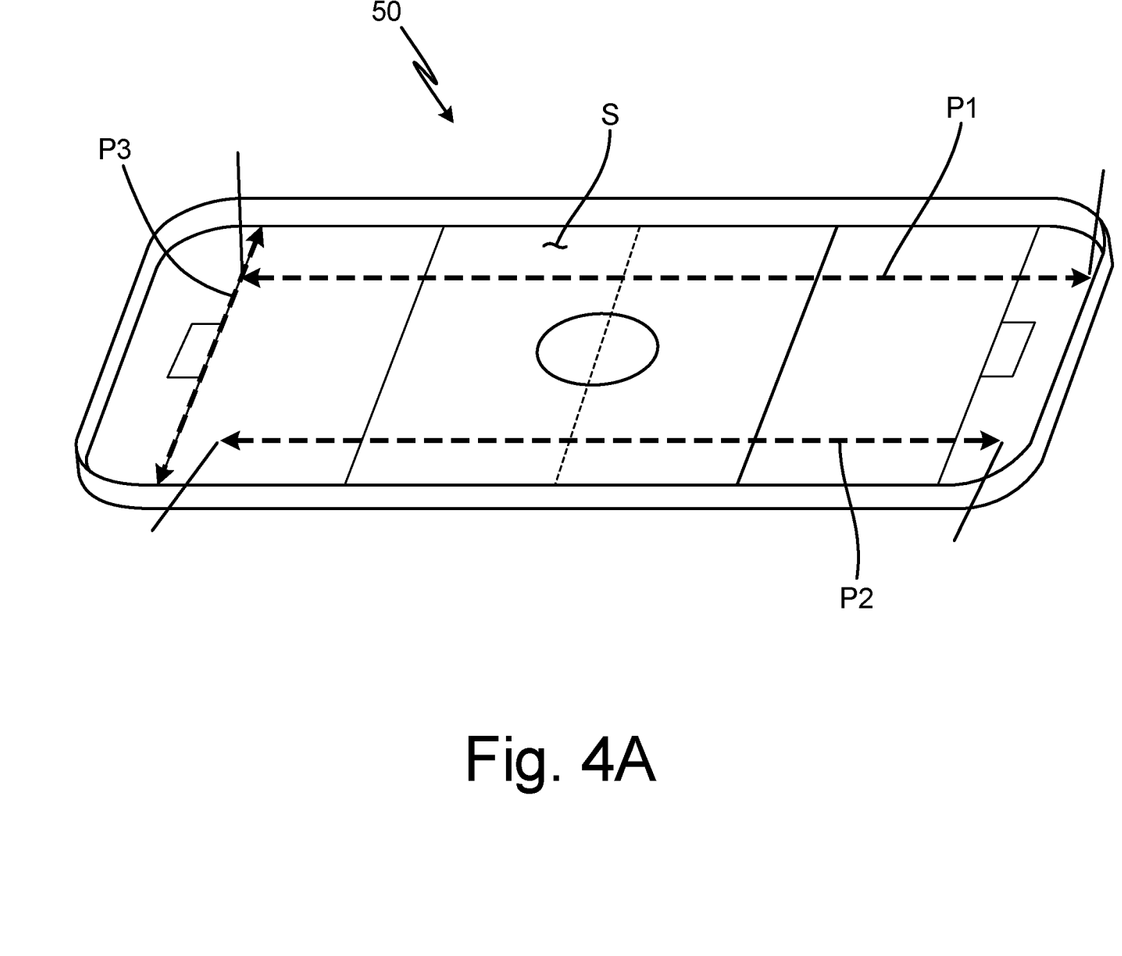
FIG. 4A is a schematic of an ice rink.
Figure 4B:
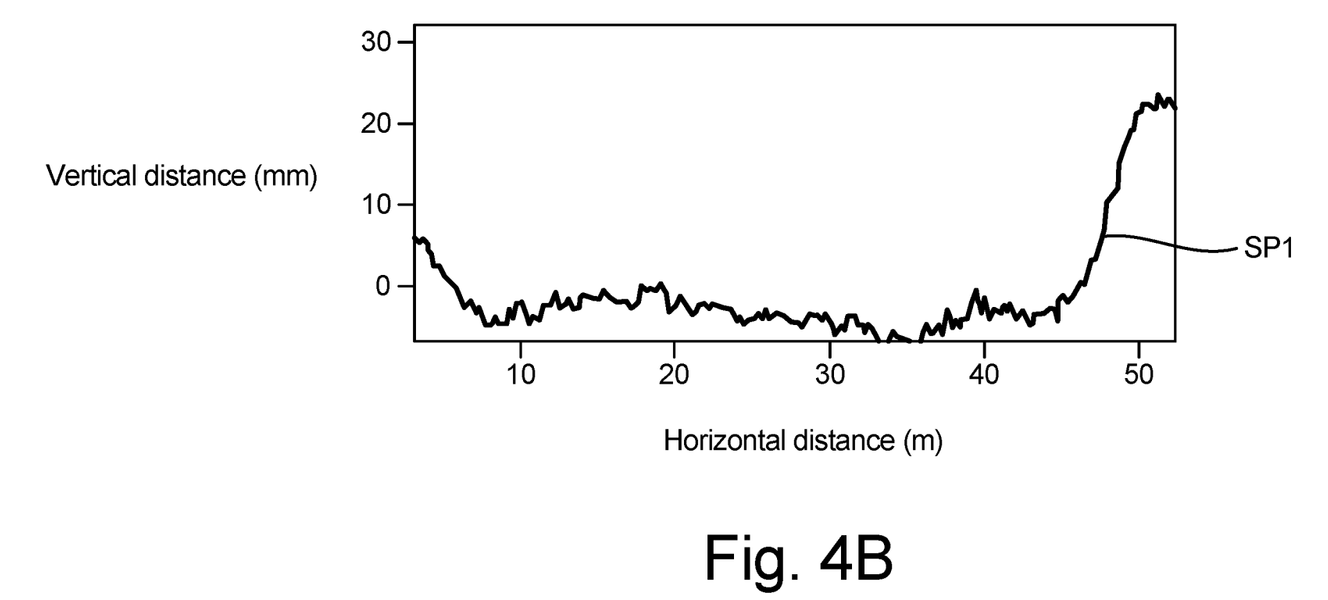
FIG. 4B is a graph showing a first surface profile.
Figure 4C:
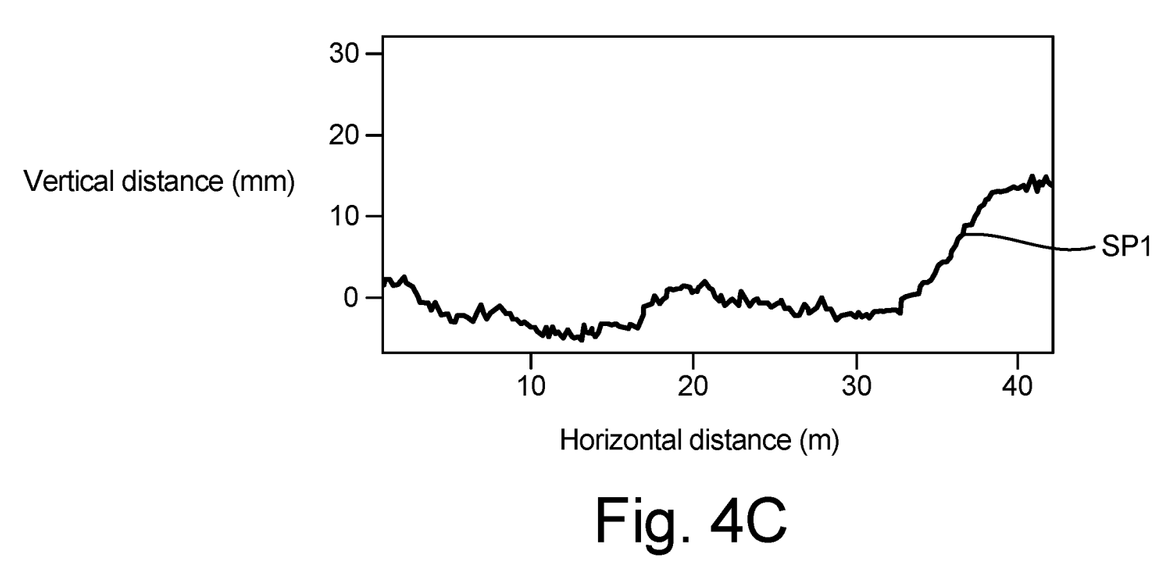
FIG. 4C is a graph showing a second surface profile.

FIG. 4A is a schematic diagram of ice rink 50 including surface S. FIG. 4B is a graph showing a surface profile SP1 taken along path P1 in FIG. 4A. FIG. 4C is a graph showing a surface profile SP2 taken along path P2 in FIG. 4A. FIGS. 4A-4C will be discussed together.

As previously discussed, profiling machine 12 is configured to generate both incline data and displacement data. Surface profiles, such as surface profiles SP1 and SP2, are generated based on the incline data and the displacement data. A linear function can be subtracted from the data-sets to produce an average elevation near zero, thereby establishing a baseline. In other examples, thickness data can be provided and the y-axis can be adjusted based on the thickness data. As expected, the surface profiles SP1 and SP2 indicate that surface S is thicker near the corners and edges, where the ice resurfacer generally slows down, thereby depositing more water and creating more ice. In addition, the corners may not experience as much wear as other portions of surface S.

The vertical axis of each of the graphs shown in FIGS. 4B and 4C is the elevation of surface S relative to the starting location of profiling machine 12. The horizontal axis of each of the graphs shown in FIGS. 4B and 4C is the distance that profiling machine 12 has traveled along surface S from the starting location of profiling machine 12. As shown, profiling machine 12 can measure deviations from flat with near millimeter precision.

Figure 5:
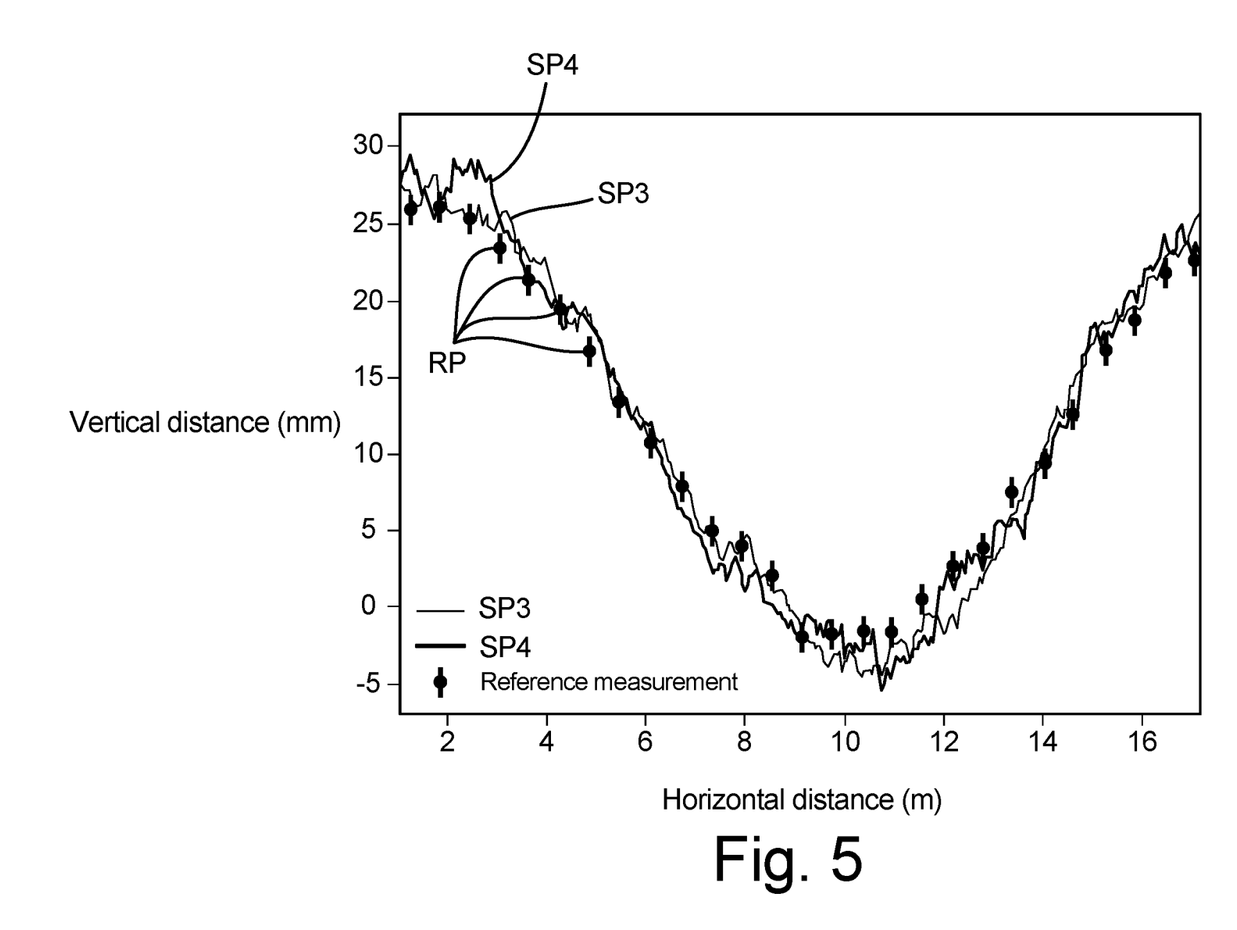
FIG. 5 is a graph showing third and fourth surface profiles.

FIG. 5 is a graph showing surface profiles SP3 and SP4 taken along path P3 in FIG. 4A. Also shown is a plot of reference points RP indicating a reference surface profile. Surface profiles SP3 and SP3 were taken along path P3, which is along the goal line of the ice sheet forming surface S. Reference points RP were generated by projecting a laser across the ice surface S and recording the point of intersection on a ruled surface at various positions on the ice surface S.

The graph shown in FIG. 5 shows a comparison of the surface profiles SP3 and SP4 generated by profiling machine 12 with the reference profile formed by reference points RP. The surface profiles SP3 and SP4 generated by profiling machine 12 produce accurate results in accord with the reference profile generated by the individually measured reference points RP. Near the center of the surface S along path P3, which is near the location of a hockey goal, the activity of the goalie can increase the rate of ice wear and further the discrepancy in ice thickness relative to the corners. Such increased wear is accurately sensed by profiling machine 12 as indicated by surface profiles SP3 and SP4.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A surface profiling machine comprising:
a body;

a contact point configured to support the body on a surface;
an inclinometer supported by the body, the inclinometer configured to sense an angular displacement relative to an acceleration vector of gravity;
a displacement sensor supported by the body, the displacement sensor configured to sense displacement of the profiling machine relative to the surface; wherein the displacement sensor is an optical sensor comprising a camera and a light source, wherein each of the camera and light source is mounted to the surface profiling machine.

2. The surface profiling machine of claim 1, wherein the contact point is a wheel.

3. The surface profiling machine of claim 2, further comprising a motor operatively connected to the wheel to drive the wheel.

4. The surface profiling machine of claim 3, further comprising:
a contact sensor configured to sense the profiling machine contacting an obstacle.

5. The surface profiling machine of claim 1, further comprising:
control circuitry configured to generate surface profile information based on incline data generated by the inclinometer and based on displacement data generated by the displacement sensor.

6. The surface profiling machine of claim 1, wherein the light source is disposed between the body and the surface and configured to illuminate the surface.

7. An ice resurfacing system comprising:
an ice resurfacing machine; and
a surface profiling machine comprising:
  a body;
  a contact point configured to support the body on a surface, the surface being an ice sheet;
  an inclinometer supported by the body, the inclinometer configured to sense an angular displacement relative to an acceleration vector of gravity;
  a displacement sensor supported by the body, the displacement sensor configured to sense displacement of the profiling machine relative to the surface; wherein the displacement sensor is an optical sensor comprising a camera and a light source, wherein each of the camera and light source is mounted to the surface profiling machine;
wherein the inclinometer is configured to generate incline data and the displacement sensor is configured to generate displacement data;
wherein surface profile information is generated based on the incline data generated by the inclinometer and based on the displacement data generated by the displacement sensor;
wherein the ice resurfacing machine is configured to adjust at least one of a position of a blade and a volume of water sprayed based on the surface profile information.

8. The system of claim 7, further comprising:
a remote computing device configured to communicate with the surface profiling machine to receive at least one of the incline data, the displacement data, and the surface profile information from the surface profiling machine.

9. The system of claim 7, further comprising:
a motor;
wherein the contact point is a wheel and the motor is operatively connected to the wheel to drive the wheel.

10. The system of claim 9, further comprising:
a contact sensor configured to sense the profiling machine contacting an obstacle.

11. The system of claim 7, wherein the profiling machine is mounted to the resurfacing machine such that the resurfacing machine drives displacement of the profiling machine relative to the surface.

12. The system of claim 7, wherein the profiling machine further includes:
control circuitry configured to generate surface profile information based on incline data generated by the inclinometer and based on displacement data generated by the displacement sensor.

13. The system of claim 7, wherein the profiling machine is configured to wirelessly communicate the surface profile information to the ice resurfacing machine.

14. The system of claim 7, wherein the light source is disposed between the body and the surface and configured to illuminate the surface.

15. A method comprising:
traversing a surface with a profiling machine;
sensing, by an inclinometer mounted on the profiling machine, an incline of the profiling machine relative to an acceleration vector of gravity, and sensing, by a displacement sensor, a displacement of the profiling machine relative to the surface, wherein the displacement sensor is an optical sensor comprising a camera and a light source, wherein each of the camera and light source is mounted to the surface profiling machine; and
generating surface profile information based on the incline data and the displacement data.

16. The method of claim 15, wherein the step of traversing the surface with the profiling machine includes traversing the surface along a pseudorandom path.

17. The method of claim 15, wherein the surface profile information includes a topographic map of the surface.

18. The method of claim 15, further comprising:
providing the surface profile information to an ice resurfacing machine; and
controlling at least one of a height of a blade of the ice resurfacing machine relative to the surface and a volume of water dispensed by the ice resurfacing machine onto the surface based on the surface profile information;
wherein the surface is an ice sheet.

* * * * *